United States Patent
Gui et al.

(10) Patent No.: US 9,015,065 B2
(45) Date of Patent: Apr. 21, 2015

(54) METHOD, SYSTEM, AND DEVICE FOR IMPLEMENTING NETWORK BANKING SERVICE

(75) Inventors: Yonglin Gui, Xi'an (CN); Zhiqin He, Shenzhen (CN)

(73) Assignee: Huawei Device Co., Ltd., Shenzhen, P.R. (CN)

( * ) Notice: Subject to any disclaimer, the term of this patent is extended or adjusted under 35 U.S.C. 154(b) by 312 days.

(21) Appl. No.: 13/206,233

(22) Filed: Aug. 9, 2011

(65) Prior Publication Data
US 2011/0295707 A1    Dec. 1, 2011

Related U.S. Application Data

(63) Continuation of application No. PCT/CN2009/073637, filed on Aug. 31, 2009.

(30) Foreign Application Priority Data

Feb. 9, 2009 (CN) ............... 2009 1 0008838

(51) Int. Cl.
*G06Q 40/02* (2012.01)
*G06Q 50/24* (2012.01)
(Continued)

(52) U.S. Cl.
CPC ............. *G06Q 40/02* (2013.01); *G06Q 50/24* (2013.01); *G06Q 10/109* (2013.01); *G06Q 10/1093* (2013.01); *G06Q 50/22* (2013.01); *G06Q 20/206* (2013.01); *G06Q 20/382* (2013.01)

(58) Field of Classification Search
CPC . G06Q 10/1093; G06Q 10/109; G06Q 50/22; G06Q 50/24
USPC ........................................ 705/18, 2
See application file for complete search history.

(56) References Cited

U.S. PATENT DOCUMENTS 6,769,605 B1    8/2004 Magness
2002/0087392 A1*  7/2002 Stevens .................... 705/10
(Continued)

FOREIGN PATENT DOCUMENTS

CN    1334541 A    2/2002
CN    2482772 Y    3/2002
(Continued)

OTHER PUBLICATIONS

Extended European Search Report issued in corresponding European Patent Application No. 09839535.3, mailed Nov. 18, 2011.
(Continued)

*Primary Examiner* — Seye Iwarere
(74) *Attorney, Agent, or Firm* — Brinks Gilson & Lione (57) ABSTRACT

In the field of communications, a method, a system, and devices for implementing a network banking service are provided. The method includes: after an agent device establishes a connection with a Point Of Sale (POS) device, the agent device performs identification with the POS device; after successful identification, the agent device performs authentication with the POS device; after successful authentication, the agent device establishes a connection with a network banking server according to a preset address of the network banking server through wireless access to the Internet; and the agent device forwards network banking service data between the POS device and the network banking server, thereby implementing the network banking service. Therefore, it is convenient for users to use a network banking service, the functions of POS devices are simplified, and the cost of manufacturing and maintaining POS devices is reduced.

24 Claims, 6 Drawing Sheets

(51) Int. Cl.
*G06Q 10/10* (2012.01)
*G06Q 50/22* (2012.01)
*G06Q 20/20* (2012.01)
*G06Q 20/38* (2012.01)

(56) References Cited

U.S. PATENT DOCUMENTS

| | | | |
|---|---|---|---|
| 2002/0178122 A1* | 11/2002 | Maes | 705/64 |
| 2003/0182162 A1* | 9/2003 | Stevens | 705/2 |
| 2004/0019564 A1* | 1/2004 | Goldthwaite et al. | 705/44 |
| 2004/0128256 A1* | 7/2004 | Krouse et al. | 705/65 |
| 2004/0267618 A1* | 12/2004 | Judicibus et al. | 705/16 |
| 2005/0075908 A1* | 4/2005 | Stevens | 705/2 |
| 2005/0171898 A1* | 8/2005 | Bishop et al. | 705/39 |
| 2005/0182720 A1* | 8/2005 | Willard et al. | 705/40 |
| 2005/0192892 A1* | 9/2005 | Willard | 705/39 |
| 2005/0250489 A1* | 11/2005 | Lazaridis | 455/426.1 |
| 2006/0032905 A1* | 2/2006 | Bear et al. | 235/380 |
| 2006/0049256 A1* | 3/2006 | von Mueller et al. | 235/449 |
| 2006/0168657 A1* | 7/2006 | Baentsch et al. | 726/21 |
| 2006/0229978 A1* | 10/2006 | Popovic et al. | 705/39 |
| 2008/0223932 A1* | 9/2008 | Mueller et al. | 235/449 |
| 2009/0048953 A1* | 2/2009 | Hazel et al. | 705/35 |
| 2009/0055319 A1* | 2/2009 | Raheman | 705/44 |
| 2009/0177586 A1* | 7/2009 | Niklan | 705/67 |
| 2010/0042545 A1* | 2/2010 | Ogg et al. | 705/60 |
| 2011/0071949 A1* | 3/2011 | Petrov et al. | 705/72 |
| 2011/0295707 A1* | 12/2011 | Gui et al. | 705/18 |

FOREIGN PATENT DOCUMENTS

| | | |
|---|---|---|
| CN | 2488239 Y | 4/2002 |
| CN | 101018130 A | 8/2007 |
| CN | 101136123 A | 3/2008 |
| CN | 101340341 A | 1/2009 |

OTHER PUBLICATIONS

Office Action issued in corresponding Chinese Patent Application No. 200910008838.4, mailed Jul. 13, 2011.
International Search Report issued in corresponding PCT Patent Application No. PCT/CN2009/073637, mailed Dec. 10, 2009.
Written Opinion of the International Searching Authority issued in corresponding PCT Patent Application No. PCT/CN2009/073637, mailed Dec. 10, 2009.
Office Action issued in corresponding Chinese Patent Application No. 200910008838.4, mailed May 10, 2013, 29 pages.
Office Action issued in corresponding Chinese Patent Application No. 200910008838.4, mailed Dec. 31, 2012.

* cited by examiner

METHOD, SYSTEM, AND DEVICE FOR IMPLEMENTING NETWORK BANKING SERVICE

This application is a continuation of International Application No. PCT/CN2009/073637, filed on Aug. 31, 2009, which claims priority to Chinese Patent Application No. 200910008838.4, filed on Feb. 9, 2009, both of which are hereby incorporated by reference in their entireties.

FIELD OF THE INVENTION

The present invention relates to the field of communications, and in particular, to a method, a system, and a device for implementing a network banking service.

BACKGROUND OF THE INVENTION

With the rapid development of communication technologies, network banking has provided people with more and more efficient and convenient services. In daily life, people can connect to a network banking server through Point Of Sale (POS) devices provided by sellers, thereby implementing fast and convenient network banking services. Two types of common POS devices exist, which are wired connection and wireless connection. During the implementation of the present invention, the inventors find that the conventional art has at least the following disadvantages and deficiencies. The wired connection is to connect a POS device to a private network for network banking through physical lines, the connection mode greatly restricts the application occasion and range of the POS device, and the cost of manufacturing, deploying, and maintaining the POS device is high; while the wireless connection is to connect a POS device to a banking server through a private wireless network for network banking so as to implement network banking services, the POS device of wireless connection requires not only the function of banking services but also the function of wireless communication, so that the functions of the POS device are complicated, and the cost for manufacturing and maintenance is even higher.

SUMMARY OF THE INVENTION

In order to enable users to use a network banking service conveniently and simplify the functions of a POS device, so as to reduce the cost of manufacturing and maintaining the POS device, the present invention is directed to a method, a system, and a device for implementing a network banking service. The technical solutions are as follows.

According to one aspect, an embodiment of the present invention provides a method for implementing a network banking service, where the method includes:

performing, by an agent device, identification with a POS device after the agent device establishes a connection with the POS device;

performing, by the agent device, authentication with the POS device after successful identification;

establishing, by the agent device, a connection with a network banking server through wireless access to the Internet after successful authentication; and forwarding, by the agent device, network banking service data between the POS device and the network banking server, thereby implementing the network banking service.

According to another aspect, an embodiment of the present invention further provides a system for implementing a network banking service, where the system includes an agent device, being connected to a network banking server and a POS device.

The agent device is configured to perform identification with the POS device after establishing a connection with the POS device; perform authentication with the POS device after successful identification; establish a connection with the network banking server through wireless access to the Internet according to a preset address of the network banking server after successful authentication; and forward network banking service data between the POS device and the network banking server, thereby implementing the network banking service.

According to another aspect, an embodiment of the present invention further provides an agent device, where the agent device includes:

an establishment module, configured to establish a connection with a POS device;

an identification module, configured to perform identification with the POS device after the connection with the POS device is established;

an authentication module, configured to perform authentication with the POS device after successful identification;

a connection module, configured to establish a connection with a network banking server through wireless access to the Internet after successful authentication; and a service module, configured to forward network banking service data between the POS device and the network banking server, thereby implementing a network banking service.

According to another aspect, an embodiment of the present invention further provides a POS device, where the POS device includes:

an establishment module, configured to establish a connection with an agent device;

an identification module, configured to perform identification with the agent device after the connection with the agent device is established;

an authentication module, configured to perform authentication with the agent device after successful identification; and a service module, configured to exchange network banking service data with a network banking server through the agent device after successful authentication, thereby implementing a network banking service, where the agent device establishes a connection with the network banking server through wireless access to the Internet.

According to another aspect, an embodiment of the present invention further provides a network banking server, where the network banking server includes:

an establishment module, configured to establish a connection with an agent device through the Internet; and a service module, configured to exchange network banking service data with a POS device through the agent device, thereby implementing a network banking service.

The technical solutions according to the embodiments of the present invention have the following beneficial effects.

After an agent device establishes a connection with a network banking server through wireless access to the Internet, the agent device forwards network banking service data between a POS device and the network banking server, so that it is more convenient for users to use a network banking service, and the functions of the POS device are simplified, so as to reduce the cost of manufacturing and maintaining the POS device.

BRIEF DESCRIPTION OF THE DRAWINGS

The accompanying drawings are illustrated to provide further understanding of the present invention and constitute a part of the present application, but not intended to limit the present invention, in which.

DETAILED DESCRIPTION OF THE EMBODIMENTS

In order to make the objectives, technical solutions, and advantages of the present invention more comprehensible, the specific embodiments of the present invention are described in detail below with reference to the accompanying drawings. Herein, the exemplary embodiments of the present invention and description thereof are for the illustrative purpose only, but not intended to limit the present invention.

Embodiment 1

Figure 1:
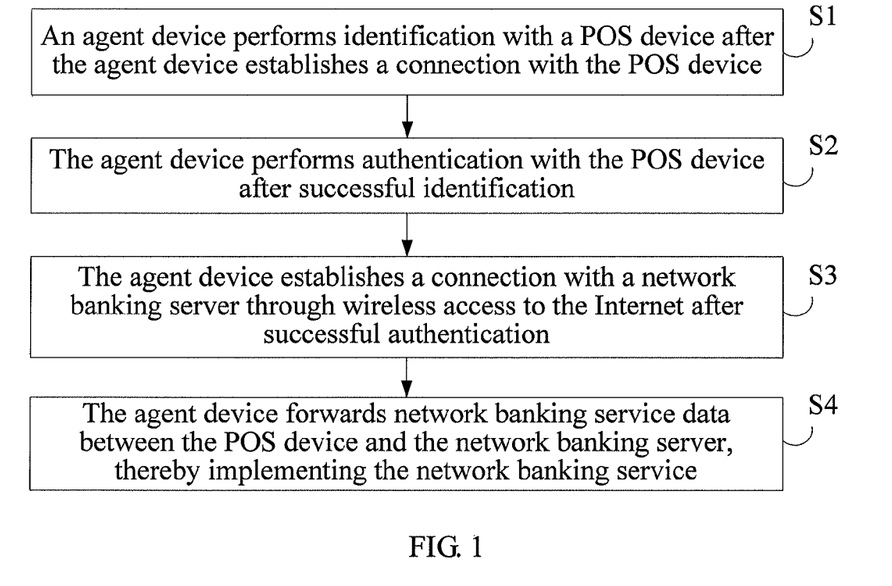
FIG. 1 is a schematic flow chart of a method for implementing a network banking service according to Embodiment 1 of the present invention.

In order to enable users to use a network banking service conveniently and simplify the functions of a POS device, so as to reduce the cost of manufacturing and maintaining the POS device, an embodiment of the present invention provides a method for implementing a network banking service. Referring to FIG. 1, the method is described as follows. When a user needs to perform a network banking service, the method includes the following steps.

In step S1, an agent device performs identification with a POS device after the agent device establishes a connection with the POS device.

In step S2, the agent device performs authentication with the POS device after successful identification.

In step S3, the agent device establishes a connection with a network banking server through wireless access to the Internet after successful authentication.

When the agent device establishes the connection with the network banking server through wireless access to the Internet, the specific implementation may employ a mode that the agent device establishes the connection with the network banking server through wireless access to the Internet according to a preset address of the network banking server.

In step S4, the agent device forwards network banking service data between the POS device and the network banking server, thereby implementing the network banking service.

The performing, by the agent device, identification with the POS device in step S1 includes the following:

The agent device identifies the POS device, and/or the POS device identifies the agent device. The identifying, by the agent device, the POS device includes: sending, by the POS device, a device identity of the POS device to the agent device, and identifying, by the agent device, the POS device according to the received device identity. The identifying, by the POS device, the agent device includes: sending, by the agent device, a device identity of the agent device to the POS device, and identifying, by the POS device, the agent device according to the received device identity.

The performing, by the agent device, authentication with the POS device in step S2 includes the following:

The agent device authenticates the POS device, and/or the POS device authenticates the agent device. The authenticating, by the agent device, the POS device includes the following step.

The agent device receives authentication information sent by the POS device, determines, according to the preset authentication information of the agent device, whether the received authentication information matches preset authentication information of the agent device, and if yes, the agent device authenticates the POS device successfully.

The authenticating, by the POS device, the agent device includes the following step.

The POS device receives authentication information sent by the agent device, determines, according to the pre-stored authentication information of the POS device, whether the received authentication information matches pre-stored authentication information of the POS device, and if yes, the POS device authenticates the agent device successfully.

Further, the authentication information is specifically: encrypted authentication information. Accordingly, before determining whether the received authentication information matches the preset authentication information of its own, the method further includes: decrypting the encrypted authentication information.

Further, after successful authentication, the method according to the embodiment of the present invention further includes the following steps. The POS device receives user authentication information sent by the user, and sends the user authentication information to the agent device.

The agent device receives the user authentication information sent by the POS device, and authenticates the user according to pre-stored user authentication information of its own. Accordingly, after the agent device authenticates the user successfully, the agent device forwards the network banking service data between the POS device and the network banking server. The authenticating, by the agent device, the user includes the following step.

The agent device receives the user authentication information sent by the POS device, determines, according to the pre-stored user authentication information of the agent device, whether the user authentication information sent by the POS device matches the pre-stored user authentication information of its own, and if yes, the agent device authenticates the user successfully.

The forwarding, by the agent device, the network banking service data between the POS device and the network banking server in step S4 includes the following steps.

The agent device receives a network banking service request encrypted by the POS device according to requirements for communication between the agent device and the POS device and network banking data requirements, processes the received encrypted network banking service request according to requirements for communication between the agent device and the network banking server, and then sends the processed request to the network banking server.

The agent device receives an network banking service response encrypted by the network banking server according to requirements for communication between the agent device and the network banking server and network banking data requirements, processes the received encrypted network banking service response according to requirements for communication between the agent device and the POS device, and then sends the processed response to the POS device.

Further, after the network banking server receives the network banking service request, the method further includes the following steps.

The POS device receives service authentication information input by the user, and forwards the service authentication information to the network banking server through the agent device.

The network banking server determines, according to the received service authentication information and the pre-stored service authentication information of the network banking server, whether the received service authentication information matches pre-stored service authentication information of its own, and if yes, the network banking server authenticates the service of the user successfully, and implements subsequent one or more steps of the network banking service.

Further, after the network banking service is implemented, the method according to the embodiment of the present invention further includes the following step.

The agent device receives a notification from the POS device, releases the connection with the POS device, and releases the connection with the network banking server.

In the method for implementing a network banking service according to the embodiment of the present invention, through the agent device according to the embodiment of the present invention, it is more convenient for users to use a network banking service, and the functions of the POS device are simplified, so as to reduce the cost of manufacturing and maintaining the POS device.

The method according to the embodiment of the present invention is illustrated in detail through the following embodiments.

Embodiment 2

Figure 2:
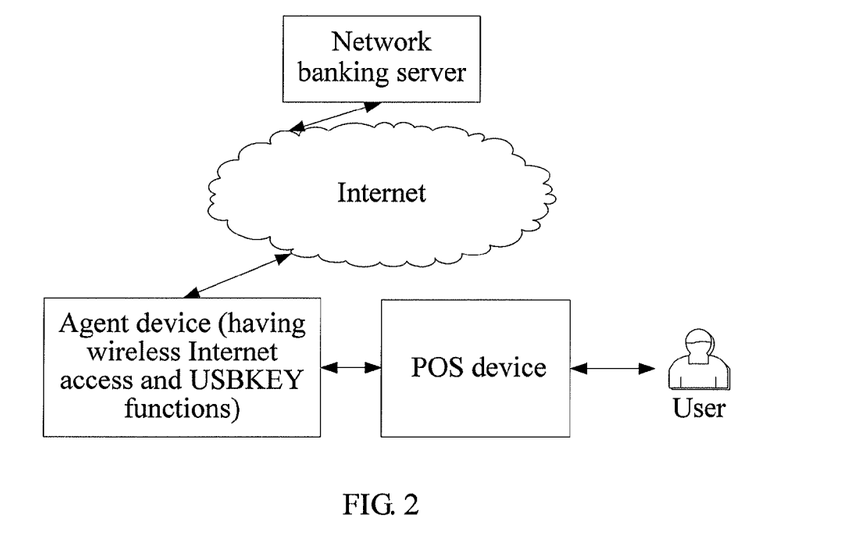
FIG. 2 is a schematic diagram of networking for implementing a network banking service according to Embodiment 2 of the present invention.

FIG. 2 is a schematic diagram of networking for implementing a network banking service according to an embodiment of the present invention. As shown in FIG. 2, the networking includes a POS device, an agent device, and a network banking server. First of all, the functions of the devices are illustrated.

I. POS Device

1. The POS device can be connected to an agent device. The mode of establishing a connection with the agent device by the POS device includes, but is not limited to, Universal Serial Bus (USB) connection, Bluetooth connection, and infrared connection.

2. The POS device can provide relevant operations of a network banking service for users. The relevant operations include, but are not limited to, deposit, expenditure, and account transfer.

3. The POS device supports the authentication function for performing security authentication. The authentication includes, but is not limited to, authentication of an agent device and authentication of a user. The authentication mode includes, but is not limited to, password authentication and fingerprint authentication. The authentication algorithm includes, but is not limited to, SHA1, SHA2, MD5, HMAC, CMAC, and digital signature.

4. The POS device supports the data encryption and decryption function for encrypting and decrypting data. The data encryption and decryption specifically includes, but is not limited to, encryption and decryption of communication data between the POS device and an agent device, and encryption and decryption of service data between the POS device and a network banking server. The encryption and decryption algorithm includes, but is not limited to, symmetric encryption algorithms, namely, DES, 3DES, RC2, RC5, RC6, and AES, and asymmetric encryption algorithms, namely, Diffie-Hellman, RSA, and Elliptic Curve Cryptography (ECC).

5. The POS device supports basic functions such as prompt, input, and printing. The prompt function is to provide corresponding information of a network banking service to a user of the POS device. The prompt mode includes, but is not limited to, display such as a Liquid Crystal Display (LCD) display interface and a Cathode Ray Tube (CRT) display interface, or voice prompts. The input function is to support input of information related to the implementation of a network banking service by a user. The input mode includes, but is not limited to, keyboard input, touch screen input, and fingerprint input. The printing function is to print and output information related to a network banking service being performed for a user. The printing mode includes, but is not limited to, a built-in printing module of the POS device and an external printer of the POS device.

II. Agent Device

1. The agent device can be connected to a POS device. The mode of establishing a connection with the POS device by the agent device includes, but is not limited to, USB connection, Bluetooth connection, and infrared connection.

2. The agent device supports wireless access to the Internet and supports network communication. The mode of wireless access to the Internet includes, but is not limited to, access to the Internet based on a Wireless Local Area Network (LAN) (WLAN) and access based on a mobile communication system (for example, a 3rd Generation (3G) system).

3. The agent device supports the storage of network banking-related information, that is, the device stores network banking-related information and personal identity information of a user.

4. The agent device supports the authentication function, and has the USBKEY function, for performing security authentication. The authentication includes, but is not limited to, authentication of a POS device and authentication of a user. The authentication mode includes, but is not limited to, password authentication and fingerprint authentication. The authentication algorithm includes, but is not limited to, SHA1, SHA2, MD5, HMAC, CMAC, and digital signature.

5. The agent device supports the data encryption and decryption function for encrypting and decrypting data. The data encryption and decryption specifically includes, but is not limited to, encryption and decryption of communication data between the agent device and a POS device, and encryption and decryption of communication data between the agent device and a network banking server. The encryption and decryption algorithm includes, but is not limited to, symmetric encryption algorithms: DES, 3DES, RC2, RC5, RC6, and AES; and asymmetric encryption algorithms: Diffie-Hellman, RSA, and Elliptic Curve Cryptography (ECC).

III. Network Banking Server

The network banking server provides a network banking service for a user.

Figure 3A:
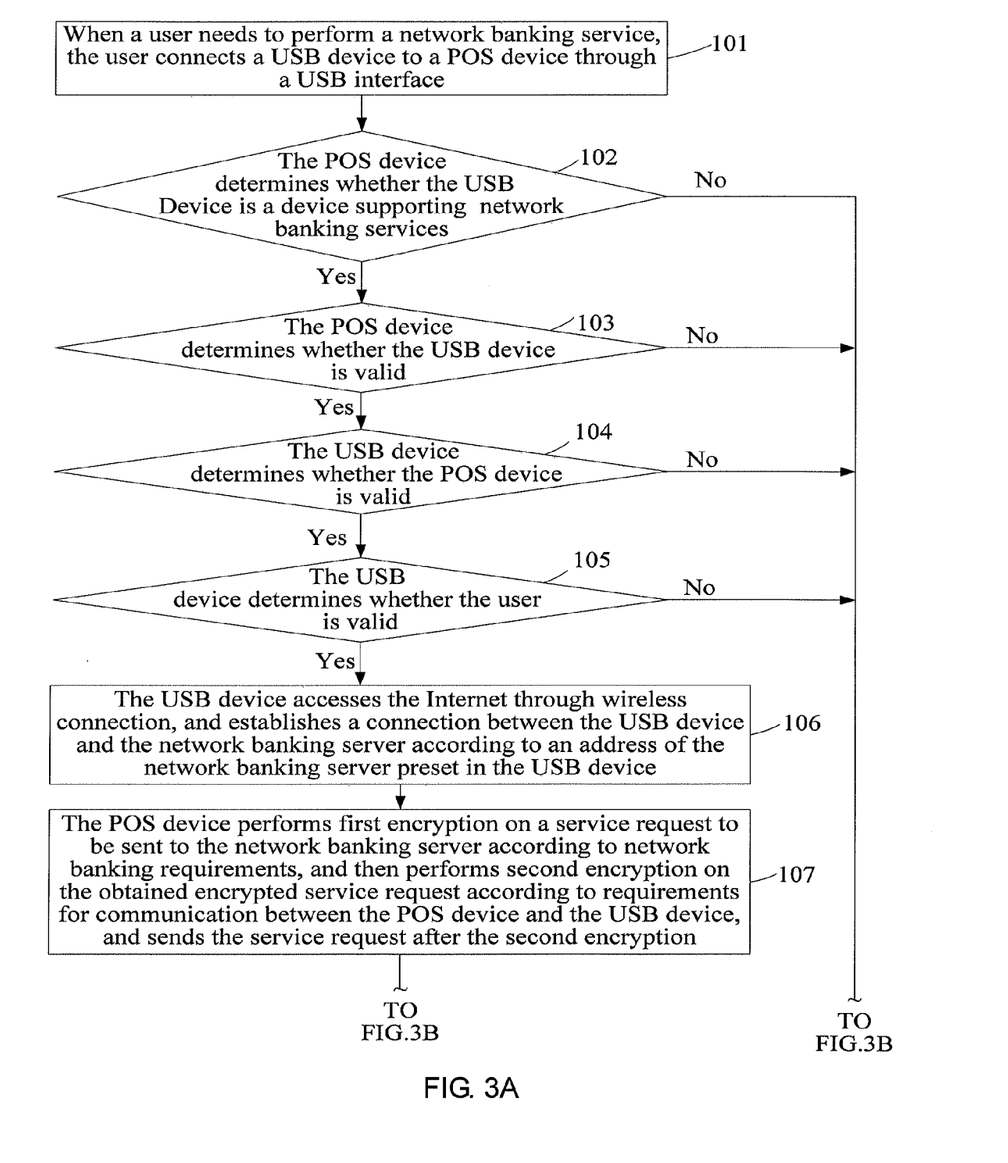
FIGS. 3A and 3B show a schematic flow chart of a method for implementing a network banking service according to Embodiment 2 of the present invention.
Figure 3B:
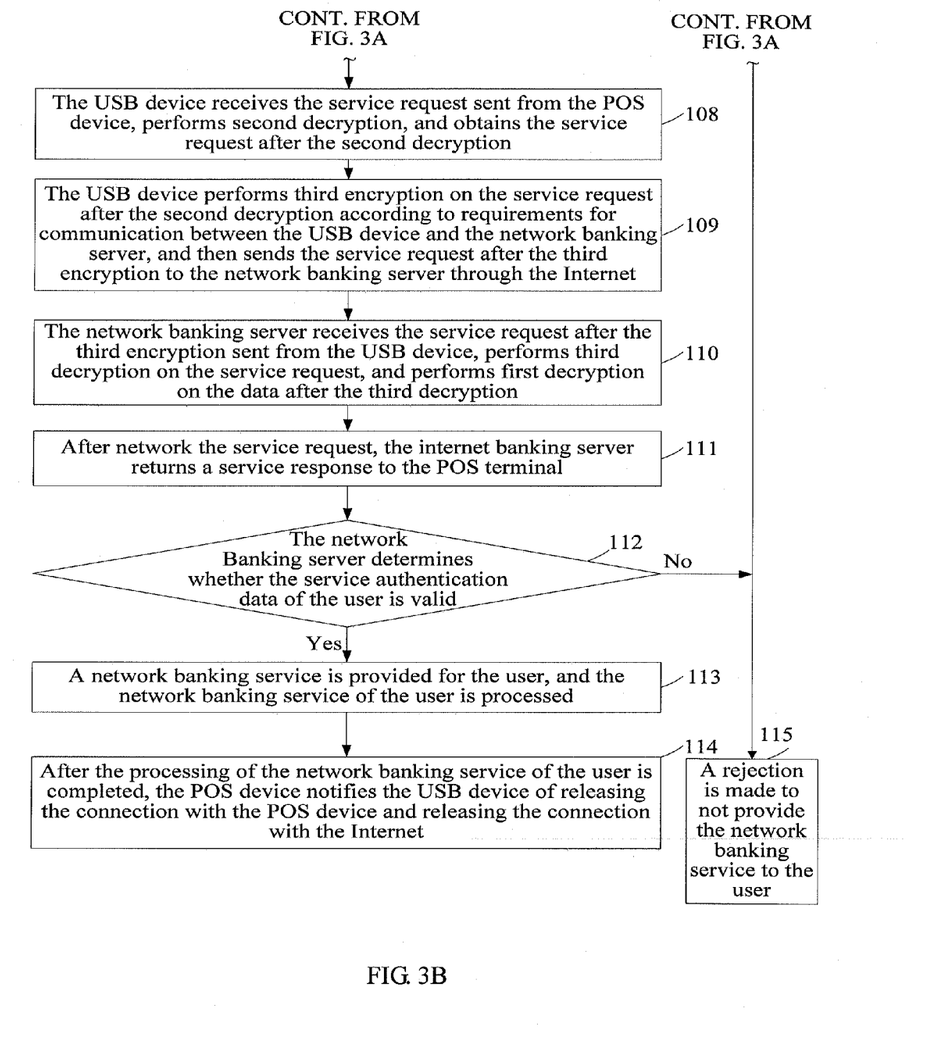
Figure 4:
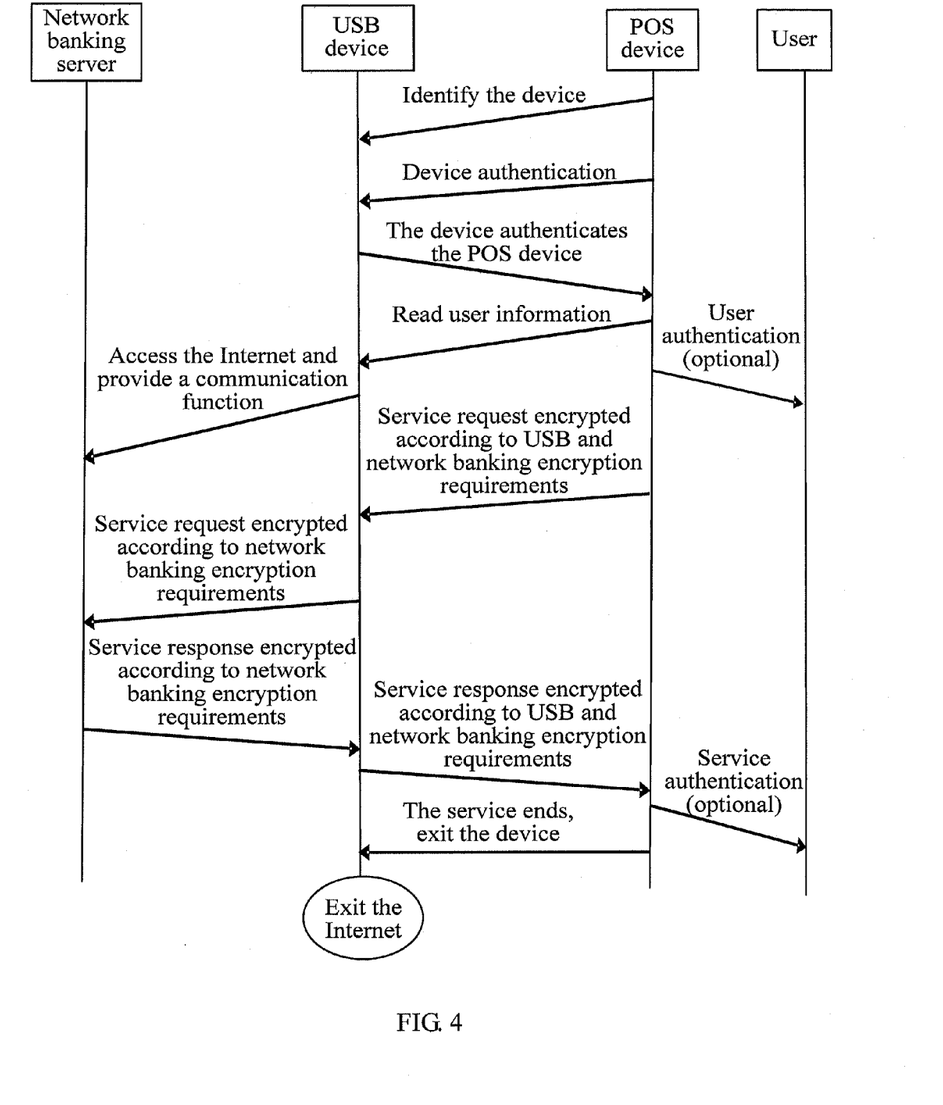
FIG. 4 is a schematic view of information exchange of the method for implementing a network banking service according to Embodiment 2 of the present invention.

Based on the scenario shown in FIG. 2, in the embodiment of the present invention, for ease of description, the agent device specifically being a USB device supporting wireless access to the Internet and supporting the USB KEY is taken as an example, and accordingly, the POS device and the USB device establish a connection through a USB interface. FIGS. 3 and 4 are respectively a flow chart and a schematic view of information exchange of a method for implementing a network banking service according to the embodiment of the present invention. The specific contents are as follows.

Step 101: When a user needs to perform a network banking service, the user connects a USB device to a POS device through a USB interface.

Step 102: The POS device identifies the connected USB device, determines whether the USB device is a device supporting network banking services, and if yes, step 103 is performed; otherwise, step 115 is performed.

After the USB device is inserted into the POS device through the USB interface, the USB device sends a device identity to the POS device, and accordingly, the POS device determines, according to the device identity sent by the USB device, whether the USB device is a device supporting network banking services, and if yes, the USB device is identified successfully; otherwise, the USB device fails to be identified.

In the identification process, communication data between the POS device and the USB device may not be encrypted. In order to ensure the security and reliability of network banking services, the communication data between the POS device and the USB device may be encrypted. As described above, the encryption algorithm includes, but is not limited to, symmetric encryption algorithms: DES, 3DES, RC2, RC5, RC6, and AES; and asymmetric encryption algorithms: Diffie-Hellman, RSA, and Elliptic Curve Cryptography (ECC).

Step 103: The POS device performs validity authentication on the USB device, and determines whether the USB device is valid, and if yes, step 104 is performed; otherwise, step 115 is performed.

After the POS device identifies the USB device successfully, the POS device initiates an authentication request to the USB device, receives an authentication response returned from the USB device, where the authentication response carries authentication information of the USB device, determines whether the received authentication information of the USB device matches pre-stored authentication information of the POS device itself, and if yes, determines that the USB device is authenticated successfully, and is a valid USB device; otherwise, determines that the USB device fails to be authenticated, and is an invalid USB device. As described above, the algorithm used for authentication includes, but is not limited to, SHA1, SHA2, MD5, HMAC, CMAC, and digital signature, which is not limited in this embodiment.

Step 104: The USB device performs validity authentication on the POS device, and determines whether the POS device is valid, and if yes, step 105 is performed; otherwise, step 115 is performed.

After the POS device authenticates the USB device successfully, in order to further ensure the security and reliability of network banking services, the USB device needs to authenticate the POS device. The contents are as follows. The USB device initiates an authentication request to the POS device, receives an authentication response returned from the POS device, where the authentication response carries authentication information of the POS device, determines whether the received authentication information of the POS device matches pre-stored authentication information of the USB device itself, and if yes, determines that the POS device is authenticated successfully, and is a valid POS device; otherwise, determines that the POS device fails to be authenticated, and is an invalid POS device. As described above, the algorithm used for authentication includes, but is not limited to, SHA1, SHA2, MD5, HMAC, CMAC, and digital signature, which is not limited in this embodiment.

The order of performing steps 103 and 104 may also be that step 104 is performed first and then step 103 is performed, that is, first, the USB device authenticates the POS device, and then, the POS device authenticates the USB device, which is not limited in this embodiment.

In actual applications, on the occasion that the requirements for the security and reliability of network banking services are not high, either of steps 103 and 104 may also be selected to be performed, for example, it is only necessary that the USB device authenticates the POS device, or it is only necessary that the POS device authenticates the USB device, which is not limited in this embodiment.

In the authentication process involved in steps 103 and 104, data for authentication exchanged in the communication between the USB device and the POS device may not be encrypted. However, in order to ensure the security and reliability of network banking services, the communication data between the POS device and the USB device may be encrypted. As described above, the encryption algorithm includes, but is not limited to, symmetric encryption algorithms: DES, 3DES, RC2, RC5, RC6, and AES; and asymmetric encryption algorithms: Diffie-Hellman, RSA, and Elliptic Curve Cryptography (ECC).

Step 105: The POS device receives user information input by the user, and forwards the user information to the USB device, and the USB device performs identity authentication on the user according to the received user information input by the user and forwarded by the POS device and pre-stored user information of the USB device, and determines whether the user is valid, and if yes, step 106 is performed; otherwise, step 115 is performed.

After the POS device performs mutual authentication with the USB device successfully, the USB device sends a request to the POS device, where the request is configured to request the POS device to provide user information, accordingly, the user provides its own user information to the POS device according to a prompt (for example, display or a voice prompt) of the POS device, where the user information includes, but is not limited to, user identity information such as fingerprint data information, password data information, and iris data information; preferably, password data information is taken as an example in this embodiment, the POS device receives password data input by the user and forwards the password data to the USB device, and the USB device determines, according to the pre-stored user password data of its own, whether the received password data matches pre-stored password data of its own, and if yes, determines that the user is a valid user; otherwise, determines that the user is an invalid user.

Step 105 is an optional step. In actual applications, the USB device may also not perform identity authentication on the user, so as to reduce the complexity of user operation, save the time for performing a network banking service by the user, and improve the efficiency of the network banking service.

Step 106: The USB device accesses the Internet through wireless connection, and establishes a connection between the USB device and the network banking server according to an address of the network banking server preset in the USB device.

Step 107: The POS device performs first encryption on a service request to be sent to the network banking server according to network banking requirements, and then performs second encryption on the obtained encrypted service request according to requirements for communication between the POS device and the USB device, and sends the service request after the second encryption.

In order to perform a network banking service, the POS device needs to send a service request to the network banking server, where the service request carries information about the type of the network banking service (for example, payment, query, and account transfer), user account information, information about identity (for example, number) of the POS device. Since when a network banking service is performed, the network banking server has its own encryption requirements for transmitted data in order to ensure the security and reliability of the network banking service, at this time, the POS device is required to perform encryption (referred to as first encryption) on a service request to be sent according to the network banking requirements, and in order to ensure the security and reliability of the network banking service, the communication between the POS device and the USB device needs to be encrypted, so that it is necessary to perform encryption again (referred to as second encryption) on the data after the first encryption. As described above, the encryption algorithm includes, but is not limited to, symmetric encryption algorithms: DES, 3DES, RC2, RC5, RC6, and AES; and asymmetric encryption algorithms: Diffie-Hellman, RSA, and Elliptic Curve Cryptography (ECC). The first encryption algorithm and the second encryption algorithm may be the same or different, which is not limited in this embodiment. For example, data of the service request to be sent by the POS device to the network banking server is A, DES is used as the first encryption algorithm, and data A1 is obtained after the first encryption; second encryption is performed on the data A1 (it is assumed that the second encryption algorithm is RSA), and then data A2 is obtained and sent to the USB device.

Step 108: The USB device receives the service request sent by the POS device, performs second decryption, and obtains the service request after the second decryption.

Continuing with the above example, after receiving the data A2, the USB device decrypts the data A2 by using the RSA algorithm, and obtains the data A1 (that is, data after the second decryption, also data after the first encryption).

Step 109: The USB device performs third encryption on the service request after the second decryption according to requirements for communication between the USB device and the network banking server, and then sends the service request after the third encryption to the network banking server through the Internet.

Continuing with the above example, after receiving the data A1, the USB device performs third encryption by using the Diffie-Hellman algorithm, obtains A3, and sends A3.

Since in step 106, the USB device already accesses the Internet through wireless connection, and establishes the connection between the USB device and the network banking server according to the address of the network banking server preset in the USB device, in step 109, the USB device sends the service request after transmission and decryption to the network banking server through the Internet.

Further, if the USB device and the network banking server have no requirements for transmission and encryption, the obtained service request after transmission and decryption is directly sent to the network banking server through the Internet.

Step 110: The network banking server receives the service request after the third encryption sent by the USB device, performs third decryption on the service request, and performs first decryption on the data after the third decryption.

Continuing with the above example, after receiving A3, the network banking server performs third decryption by using the Diffie-Hellman algorithm, and obtains A1.

Step 111: After receiving the service request, the network banking server returns a service response to the POS terminal.

In this embodiment, in order to further improve the security and reliability of a network banking service, after receiving a service request, the network banking server processes the network banking service according to information such as a service type and a user account carried in the service request, for example, records the service type of the user, requests the user to provide real-time service authentication data for performing the service type according to the service type requirement, so as to ensure the security of the network banking service performed for the user, and accordingly, the network banking server returns a service response to the POS terminal, where the service response is used for notifying the POS terminal to provide the real-time service authentication data of the user to the network banking server.

When the network banking server returns the service response to the POS terminal, as shown in FIG. 4, data encryption and decryption processes are still required between the network banking server and the USB device and between the USB device and the POS device respectively, and the processes are similar to that above, and will not be described again.

Step 112: The POS terminal receives service authentication data provided by the user, and forwards the service authentication data to the network banking server through the USB device, and the network banking server determines, according to pre-stored service authentication data of its own, whether the received service authentication data of the user is valid, and if yes, step 113 is performed; otherwise, step 115 is performed.

The service authentication data provided by the user may be real-time service authentication data, for example, delivered by the network in the form of a short message, or dynamic service authentication data, which is not limited in this embodiment.

Data encryption and decryption processes are still employed for data communication between the POS device and the USB device and between the USB device and the network banking server, and the processes are similar to that above, and will not be described again.

Step 113: A network banking service is provided for the user, and the network banking service of the user is processed.

When the process proceeds to step 113, it represents that the network banking server has authenticated the network banking service desired by the user successfully, and accordingly, the network banking server processes the desired service (for example, consumption, account transfer, or the like) by the user correspondingly. The mode and method for processing the service by the network banking server may be similar to that supported in the conventional art, and will not be described in this embodiment again.

Step 114: After the processing of the network banking service of the user is completed, the POS device notifies the USB device to release the connection with the POS device and release the connection with the Internet.

Till now, the user implements the current network banking service.

In step 115, a rejection is made to not provide the network banking service to the user, and the process ends.

In view of the above, the method for implementing a network banking service according to the embodiment of the present invention simplifies the functions of the POS device, so that the POS device only needs to support network banking, can be used in any areas with wireless network coverage very conveniently, and may be mains powered or battery powered.

Through the USB device according to the embodiment of the present invention, the USB KEY is combined with the wireless access function in the USB device, so that it is more convenient for people to use network banking in daily life.

In actual applications, due to the convenience of mobile terminals (for example, mobile phones) in use as well as the arrival of the 3G era of mobile terminals, the functions of the USB device may also be implemented by a mobile terminal, so as to further improve the efficiency and convenience in people's use of network banking, and the method is similar, and will not be described again.

In the method for implementing a network banking service according to the embodiment of the present invention, through the agent device according to the embodiment of the present invention, it is more convenient for users to use a network banking service, and the functions of the POS device are simplified, so as to reduce the cost of manufacturing and maintaining the POS device.

Embodiment 3

Figure 5:
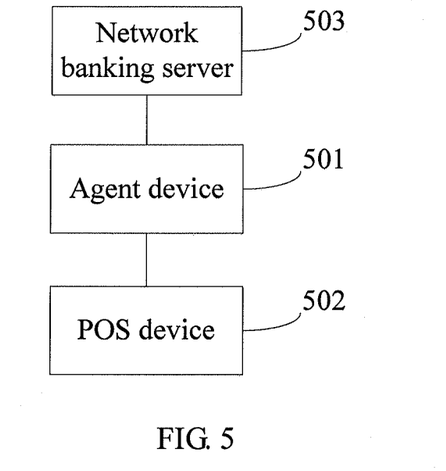
FIG. 5 is a schematic constitutional view of a system for implementing a network banking service according to Embodiment 3 of the present invention.

Referring to FIG. 5, corresponding to the method embodiments, an embodiment of the present invention provides a system for implementing a network banking service. The system includes an agent device 501 connected to a network banking server 503 and a POS device 502. The agent device 501 is configured to perform identification with the POS device 502 after establishing a connection with the POS device 502; perform authentication with the POS device 502 after successful identification; establish a connection with the network banking server 503 through wireless access to the Internet according to a preset address of the network banking server 503 after successful authentication; and forward network banking service data between the POS device 502 and the network banking server 503, thereby implementing the network banking service.

The system further includes the POS device 502, configured to establish a connection with the agent device 501, perform identification with the agent device 501, perform authentication with the agent device 501 after successful identification, and exchange the network banking service data with the network banking server 503 through the agent device 501 after successful authentication, thereby implementing the network banking service.

The system further includes the network banking server 503, configured to establish the connection with the agent device 501, and exchange the network banking service data with the POS device 502 through the agent device 501, thereby implementing the network banking service.

Further, after the authentication between the agent device 501 and the POS device 502 is successful, the POS device 502 is further configured to receive user authentication information sent by a user, and send the information to the agent device 501.

The agent device 501 is further configured to receive the user authentication information sent by the POS device 502, and authenticate the user according to pre-stored user authentication information of its own and the received user authentication information.

The network banking server 503 is specifically configured to establish a connection with the agent device 501, receive a network banking service request sent by the POS device 502 and forwarded by the agent device 501, and send a network banking service response to the POS device 502 through the agent device 501.

Further, the POS device 502 is further configured to receive service authentication information input by the user, and forward the service authentication information to the network banking server 503 through the agent device 501.

The network banking server 503 is further configured to receive the service authentication information forwarded by the agent device 501, and authenticate a service of the user according to the received service authentication information and pre-stored service authentication information of its own, for example, authenticate the service of the user by determining whether the received service authentication information matches the pre-stored service authentication information, and if yes, the network banking server 503 authenticates the service of the user successfully.

Further, after the network banking service is implemented, the POS device 502 is further configured to send a notification message to the agent device 501.

The agent device 501 is further configured to release the connection with the POS device 502 and release the connection with the network banking server 503 according to the notification message.

In the system for implementing a network banking service according to the embodiment of the present invention, through the agent device according to the embodiment of the present invention, it is more convenient for users to use a network banking service, and the functions of the POS device are simplified, so as to reduce the cost of manufacturing and maintaining the POS device.

Embodiment 4

Figure 6:
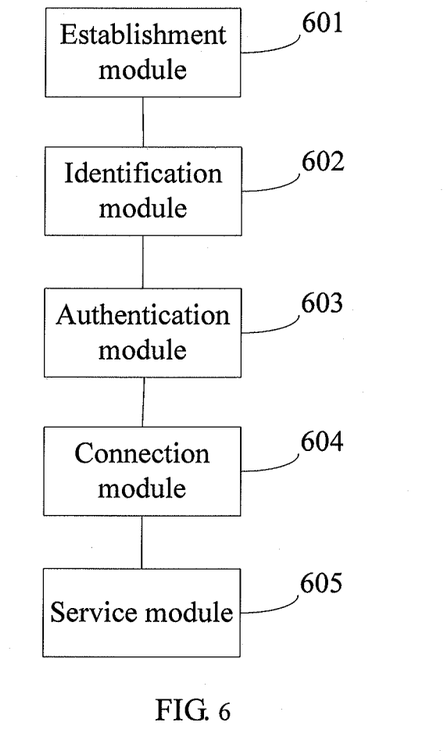
FIG. 6 is a schematic structural view of an agent device according to Embodiment 4 of the present invention.

Referring to FIG. 6, corresponding to the method embodiments and the system embodiment, an embodiment of the present invention provides an agent device. The agent device includes an establishment module 601, an identification module 602, an authentication module 603, a connection module 604, and a service module 605.

The establishment module 601 is configured to establish a connection with a POS device.

The identification module 602 is configured to perform identification with the POS device after the connection with the POS device is established.

The authentication module 603 is configured to perform authentication with the POS device after successful identification.

The connection module 604 is configured to establish a connection with a network banking server through wireless access to the Internet after successful authentication.

When the connection with the network banking server is established through wireless access to the Internet, the specific implementation may be that the agent device establishes the connection with the network banking server through wireless access to the Internet according to a preset address of the network banking server.

The service module 605 is configured to forward network banking service data between the POS device and the network banking server, thereby implementing a network banking service.

Further, when the authentication with the POS device is successful, the agent device further includes a user authentication module.

The user authentication module is configured to receive user authentication information sent by the POS device, and authenticate a user according to pre-stored user authentication information of its own.

The service module 605 includes a receiving unit and a sending unit.

The receiving unit is configured to receive a network banking service request sent by the POS device, and receive a network banking service response sent by the network banking server.

The sending unit is configured to send the network banking service request to the network banking server, and send the network banking service response to the POS device.

Further, in order to improve the security and reliability of the network banking service, the service module 605 further includes an encryption and decryption unit.

The encryption and decryption unit is configured to decrypt data received by the receiving unit and then encrypt the decrypted data according to communication requirements.

Accordingly, the sending unit is configured to send the data encrypted by the encryption and decryption unit.

Further, after the network banking service is implemented, the agent device further includes a releasing module.

The releasing module is configured to receive a notification from the POS device, and release the connection with the POS device and release the connection with the network banking server according to the notification.

The agent device according to the embodiment of the present invention establishes a connection with the network banking server through wireless access to the Internet, so as to forward network banking service data between the network banking server and the POS device, so that it is more convenient for users to use a network banking service, and the functions of the POS device are simplified, so as to reduce the cost of manufacturing and maintaining the POS device.

Embodiment 5

Figure 7:
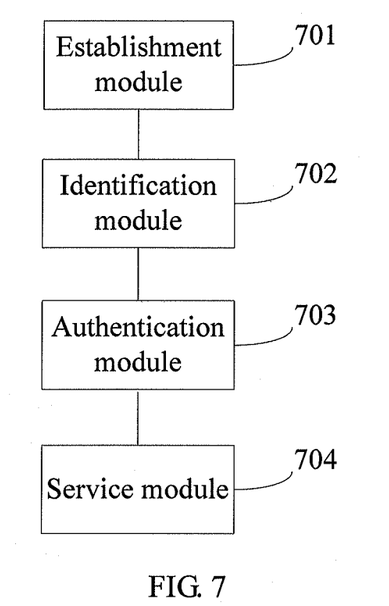
FIG. 7 is a schematic structural view of a POS device according to Embodiment 5 of the present invention.

Referring to FIG. 7, corresponding to the method embodiments and the system embodiment, an embodiment of the present invention provides a POS device. The POS device includes an establishment module 701, an identification module 702, an authentication module 703, and a service module 704.

The establishment module 701 is configured to establish a connection with an agent device.

The identification module 702 is configured to perform identification with the agent device after the connection with the agent device is established.

The authentication module 703 is configured to perform authentication with the agent device after successful identification.

The service module 704 is configured to exchange network banking service data with a network banking server through the agent device after successful authentication, thereby implementing a network banking service, where the agent device establishes a connection with the network banking server through wireless access to the Internet, thereby implementing a network banking service.

Further, the POS device further includes a processing module.

The processing module is configured to receive user authentication information input by a user after the authentication with the agent device is successful, and forward the user authentication information to the agent device, where the user authentication information enables the agent device to authenticate the user according to the user authentication information sent by the POS device and pre-stored user authentication information of its own.

Further, in order to improve the security and reliability of the network banking service, the service module 704 further includes a service authentication forwarding unit.

The service authentication forwarding unit is configured to receive service authentication information input by the user, and forward the service authentication information to the network banking server through the agent device, where the service authentication information enables the network banking server to authenticate a service of the user according to the received service authentication information and pre-stored service authentication information of its own.

Further, in order to improve the security and reliability of the network banking service, the service module 704 further includes an encryption and decryption unit.

The encryption and decryption unit is configured to encrypt a network banking service request and decrypt a network banking service response according to requirements of network banking data services.

Further, in order to improve the security and reliability of the network banking service, the POS device further includes an encryption and decryption module.

The encryption and decryption module is configured to encrypt sent data and decrypt received data according to requirements for communication with the agent device. Specifically, the encryption and decryption module is configured to encrypt data sent to the agent device and decrypt received data returned from the agent device according to requirements for communication with the agent device when the identification module performs identification with the agent device; further configured to encrypt data sent to the agent device and decrypt received data returned from the agent device according to requirements for communication with the agent device when the authentication module performs authentication with the agent device; and further configured to encrypt network banking service data sent to the agent device and decrypt received network banking service data returned from the agent device according to requirements for communication with the agent device when the service module exchanges the network banking service data with the network banking server through the agent device.

Further, after the network banking service is implemented, the POS device further includes a notification module.

The notification module is configured to send a notification to the agent device, where the notification is used for instructing the agent device to release the connection with the POS device and release the connection with the network banking server.

In the POS device according to the embodiment of the present invention, the agent device establishes a connection with the network banking server through wireless access to the Internet, so as to implementing forwarding network banking service data between the POS device and the network banking server through the agent device, so that it is more convenient for users to use a network banking service, and the functions of the POS device are simplified, so as to reduce the cost of manufacturing and maintaining the POS device.

Embodiment 6

Figure 8:
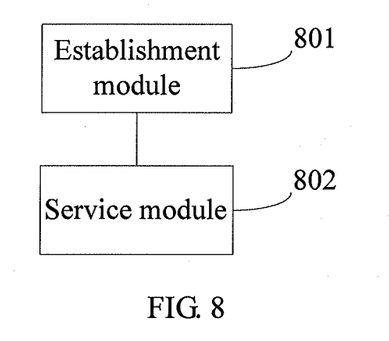
FIG. 8 is a schematic structural view of a network banking server according to Embodiment 6 of the present invention.

Referring to FIG. 8, corresponding to the method embodiments and the system embodiment, an embodiment of the present invention provides a network banking server. The network banking server includes an establishment module 801 and a service module 802.

The establishment module 801 is configured to establish a connection with an agent device through the Internet.

The service module 802 is configured to exchange network banking service data with a POS device through the agent device, thereby implementing a network banking service.

The service module 802 includes a receiving unit and a sending unit.

The receiving unit is configured to receive a network banking service request sent by the POS device and forwarded through the agent device.

The sending unit is configured to send a network banking service response to the POS device through the agent device.

Further, in order to improve the security and reliability of the network banking service, the service module 802 further includes an encryption and decryption unit.

The encryption and decryption unit is configured to decrypt the network banking service request and encrypt the network banking service response according to requirements of network banking data services.

Further, in order to improve the security and reliability of the network banking service, the network banking server further includes an encryption and decryption module.

The encryption and decryption module is configured to encrypt sent data and decrypt received data according to requirements for communication with the agent device. Specifically, the encryption and decryption module is configured to encrypt network banking service data sent by the service module to the POS device through the agent device and decrypt network banking service data sent by the POS device and received by the service module through the agent device according to requirements for communication with the agent device.

Further, in order to improve the security and reliability of the network banking service, the service module 802 of the network banking server further includes a service authentication unit.

The service authentication unit is configured to receive service authentication information input by a user and forwarded by the POS device through the agent device, and authenticate a service of the user according to pre-stored service authentication information of its own and the received service authentication information, for example, authenticate the service of the user by determining whether the received service authentication information matches the pre-stored service authentication information, and if yes, the network banking server authenticates the service of the user successfully.

The network banking server according to the embodiment of the present invention establishes a connection with the agent device that wirelessly accesses the Internet, so as to forward network banking service data between the network banking server and the POS device through the agent device, so that it is more convenient for users to use a network banking service, and the functions of the POS device are simplified, so as to reduce the cost of manufacturing and maintaining the POS device.

In the embodiments of the present invention, the word "receiving" may be understood as obtaining information from other modules on its own initiative or receiving information sent by other modules.

It should be understood by persons skilled in the art that the accompanying drawings are merely schematic views of preferred embodiments, and modules or processes in the accompanying drawings are not necessarily required in implementing the present invention.

The sequence numbers of the above embodiments of the present invention are merely for the convenience of description, and do not imply the preference among the embodiments.

Persons of ordinary skill in the art should understand that all or a part of the steps of the method according to the embodiments of the present invention may be implemented by a program instructing relevant hardware. The program may be stored in a computer readable storage medium, such as a ROM/RAM, a magnetic disk, or an optical disk.

The objectives, technical solutions, and beneficial effects of the present invention have been described in further detail through the above specific embodiments. It should be understood that the above descriptions are merely specific embodiments of the present invention, but not intended to limit the scope of the present invention. Any modification, equivalent replacement, or improvement made without departing from the spirit and principle of the present invention should fall within the protection scope of the present invention.

What is claimed is:

1. A method for implementing a network banking service, comprising:
   performing, by an agent device, identification with a Point Of Sale (POS) device after the agent device establishes a connection with the POS device;
   performing, by the agent device, authentication with the POS device after successful identification;
   establishing, by the agent device, a connection with a network banking server through a wireless network when authentication with the POS device is successful;
   receiving, by the agent device, authentication information of a user sent from the POS device;
   authenticating, by the agent device, the user according to preset authentication information;
   when the user is successfully authenticated by the agent device, forwarding, by the agent device, a network banking service data received from the POS device to the network banking server; and
   forwarding, by the agent device, another network banking service data received from the network banking server to the POS device.

2. The method according to claim 1, wherein the performing, by the agent device, identification with the POS device comprises:
   receiving, by the agent device, a device identity of the POS device from the POS device; and
   identifying, by the agent device, the POS device according to the device identity.

3. The method according to claim 1, wherein performing, by the agent device, authentication with the POS device comprises:
   receiving, by the agent device, authentication information from the POS device;
   determining, according to the preset authentication information of the agent device, whether the received authentication information matches the preset authentication information the agent device; and
   upon determining the received authentication information matches the preset authentication information of the agent device, authenticating the POS device successfully; upon determining the received authentication information doesn't match the preset authentication information of the agent device, rejecting the POS device.

4. The method according to claim 3, wherein the authentication information is encrypted authentication information, and before the determining whether the received authentication information matches the preset authentication information of the agent device, the method further comprises: decrypting the encrypted authentication information.

5. The method according to claim 1, wherein the authenticating, by the agent device, the user comprises:
determining whether the user authentication information sent by the POS device matches the preset user authentication information of the POS device, and upon determining the user authentication information sent by the POS device matches the preset user authentication information of the POS device, authenticating, by the agent device, the user successfully; upon determining the received user authentication information doesn't match the preset user authentication information of the POS device, rejecting the user by the agent device.

6. The method according to claim 1, wherein the forwarding, by the agent device, the network banking service data between the POS device and the network banking server comprises:
receiving, by the agent device, a network banking service request encrypted by the POS device according to requirements for communication between the agent device and the POS device and network banking data requirements;
processing the received encrypted network banking service request according to requirements for communication between the agent device and the network banking server; and
sending the processed request to the network banking server;
receiving, by the agent device, a network banking service response encrypted by the network banking server according to the requirements for communication between the agent device and the network banking server and the network banking data requirements;
processing the received encrypted network banking service response according to the requirements for communication between the agent device and the POS device; and
sending the processed response to the POS device.

7. The method according to claim 6, wherein the forwarding, by the agent device, the network banking service data between the POS device and the network banking server comprises:
performing second encryption on the network banking service request after a first encryption according to the requirements for communication between the agent device and the POS device;
sending the network banking service request after the second encryption;
receiving, by the agent device, the network banking service request after the second encryption sent by the POS device;
performing second decryption on the received network banking service request after the second encryption;
performing third encryption on the network banking service request after the second decryption according to the requirements for communication between the agent device and the network banking server;
sending the network banking service request after the third encryption;
receiving, by the network banking server, the network banking service request after the third encryption sent by the agent device;
performing third decryption and then first decryption on the received network banking service request after the third encryption, so as to obtain the network banking service request after the first decryption;
processing the network banking service of the user according to the network banking service request after the first decryption, so as to obtain the network banking service response;
performing fourth encryption on the network banking service response according to the network banking data requirements;
performing fifth encryption on the network banking service response after the fourth encryption according to requirements for communication between the network banking server and the agent device;
sending the network banking service response after the fifth encryption;
receiving, by the agent device, the network banking service response after the fifth encryption sent by the network banking server; performing fifth decryption on the received network banking service response after the fifth encryption; performing sixth encryption on the network banking service response after the fifth decryption according to the requirements for communication between the agent device and the POS device;
sending the network banking service response after the sixth encryption; and
receiving, by the POS device, the network banking service response after the sixth encryption sent by the agent device.

8. The method according to claim 6, wherein after the network banking server receives the network banking service request, the method further comprises:
forwarding the service authentication information from the POS device to the network banking server through the agent device; and
determining, by the network banking server according to the received service authentication information and preset service authentication information of the network banking server, whether the received service authentication information matches the preset service authentication information of the network banking server; and
upon determining the received service authentication information matches the preset-stored service authentication information of the network banking server, authenticating the service of the user successfully; upon determining the received service authentication information doesn't match the preset-stored service authentication information of the network banking server, rejecting the service of the user.

9. The method according to claim 1, wherein after the implementing the network banking service, the method further comprises: receiving, by the agent device, a notification from the POS device;
releasing the connection with the POS device; and
releasing the connection with the network banking server.

10. A system for implementing a network banking service, comprising: an agent device connected to a network banking server and a Point Of Sale (POS) device, wherein the agent device is configured to perform identification with the POS device after establishing a connection with the POS device; perform authentication with the POS device after successful identification; establish a connection with the network banking server through a wireless network when the authentication with the POS device is successful the agent device is further configured to receive authentication information of a user from the POS device, and authenticate the user according to preset authentication information, and in a case that the user is successfully authenticated, forward a network banking service data received from the POS device to the network banking server and forward another network banking service data received from the network banking server to the POS device, wherein after the authentication between the agent device and the POS device is successful, the POS device is further configured to receive user authentication information from a user, and send the user authentication information to the agent device.

11. The system according to claim 10, wherein the the POS device is configured to establish the connection with the agent device, perform identification with the agent device, perform authentication with the agent device after successful identification, and exchange the network banking service data with the network banking server through the agent device after successful authentication; and the network banking server is configured to establish the connection with the agent device, and exchange the network banking service data with the POS device through the agent device.

12. The system according to claim 11, wherein the POS device is further configured to receive service authentication information entered by the user, and forward the service authentication information to the network banking server through the agent device; and the network banking server is further configured to receive the service authentication information forwarded by the agent device, and authenticate a service of the user according to the received service authentication information and preset service authentication information of the network banking server.

13. An agent device comprising a non-transitory memory storing instructions, the instructions being executable by a processor to perform the following:

establishing a connection with a Point Of Sale (POS) device;

performing identification with the POS device after the agent device establishes the connection with the POS device;

performing authentication with the POS device after successful identification;

establishing a connection with a network banking server through a wireless network when the authentication with the POS device is successful;

receiving authentication information of a user sent from the POS device, and authenticating, by the agent device, a user according to preset-stored authentication information;

when the user is successfully authenticated by the agent device, forwarding, by the agent device, a network banking service data received from the POS device to the network banking server; and forwarding, by the agent device, another network banking service data received from the network banking server to the POS device.

14. The agent device according to claim 13, wherein the instructions being executable by the processor to further perform the following:

receiving, by the agent device, a network banking service request from the POS device, and receiving, by the agent device, a network banking service response from the network banking server; and sending, by the agent device, the network banking service request to the network banking server, and sending, by the agent device, the network banking service response to the POS device.

15. The agent device according to claim 14, wherein the instructions being executable by the processor to further perform the following:

decrypting, by the agent device, the network banking service request from the POS device and the network banking service response from the network banking server and then encrypting the decrypted data according to communication requirements; and sending, by the agent device, the encrypted data.

16. A Point Of Sale (POS) device, comprising a non-transitory memory storing instructions, the instructions being executable by a processor to perform the following:

establishing, by the POS device, a connection with an agent device;

performing, by the POS device, identification with the agent device after the connection with the agent device is established;

performing, by the POS device, authentication with the agent device after successful identification; and exchanging, by the POS device, network banking service data with a network banking server through the agent device after successful authentication, wherein the agent device establishes a connection with the network banking server through a wireless network, wherein the instructions being executable by a processor to perform the following:

receiving, by the POS device, user authentication information input by a user after the authentication with the agent device is successful, and forwarding, by the POS device, the user authentication information to the agent device, wherein the user authentication information allows the agent device to authenticate the user according to the user authentication information sent by the POS device and preset user authentication information of the POS device.

17. The Point Of Sale (POS) device according to claim 16, wherein the instructions being executable by a processor to perform the following:

receiving, by the POS device, service authentication information input by the user, and forwarding, by the POS device, the service authentication information to the network banking server through the agent device, wherein the service authentication information allows the network banking server to authenticate a service of the user according to the received service authentication information and the preset stored service authentication information of the POS device.

18. The Point Of Sale (POS) device according to claim 16, wherein the instructions being executable by a processor to perform the following:

encrypting, by the POS device a network banking service request and decrypting, by the POS device, a network banking service response, according to requirements of network banking data services.

19. The Point Of Sale (POS) device according to claim 16, wherein the instructions being executable by a processor to perform the following:

encrypting, by the POS device, data communicated to the agent device and decrypting, by the POS device, received data communicated from the agent device according to requirements for communication with the agent device when the POS device performs identification with the agent device; encrypting, by the POS device, data communicated to the agent device and decrypt received data communicated from the agent device according to the requirements for communication with the agent device when the POS device performs authentication with the agent device; and encrypting, by the POS device, network banking service data communicated to the agent device and decrypting, by the POS device, received network banking service data communicated from the agent device according to the requirements for communication with the agent device when the POS device exchanges the network banking service data with the network banking server through the agent device.

20. A network banking server, comprising a non-transitory memory storing instructions, the instructions being executable by a processor to perform the following:
    establishing, by the network banking server, a connection with an agent device through a network; and
    exchanging, by the network banking server, network banking service data with a Point Of Sale (POS) device through the agent device, wherein before establishing, by the network banking server, a connection with an agent device through a network, the agent device is further configured to receive user authentication information inputted by a user and sent from the POS device, and authenticate the user according to preset user authentication information of the agent device and the received user authentication information.

21. The network banking server according to claim 20, wherein the instructions being executable by a processor to perform the following:
    receiving, by the network banking server, a network banking service request communicated by the POS device and forwarded through the agent device; and
    communicating, by the network banking server, a network banking service response to the POS device through the agent device.

22. The network banking server according to claim 21, wherein the instructions being executable by a processor to perform the following:
    decrypting, by the network banking server, the network banking service request and encrypting, by the network banking server, the network banking service response, according to requirements of network banking data services.

23. The network banking server according to claim 20, wherein the instructions being executable by a processor to perform the following:
    encrypting, by the network banking server, network banking service data communicated by the network banking server to the POS device through the agent device and decrypting, by the network banking server, network banking service data communicated by the POS device and received by the network banking server through the agent device, according to requirements for communication with the agent device.

24. The network banking server according to claim 20, wherein the instructions being executable by a processor to perform the following:
    receiving, by the network banking server, service authentication information entered by a user and forwarded by the POS device through the agent device, and
    authenticating, by the network banking server, a service of the user according to preset service authentication information of the network banking server and the received service authentication information.

* * * * *

UNITED STATES PATENT AND TRADEMARK OFFICE
CERTIFICATE OF CORRECTION

| | | |
|---|---|---|
| PATENT NO. | : 9,015,065 B2 | Page 1 of 1 |
| APPLICATION NO. | : 13/206233 | |
| DATED | : April 21, 2015 | |
| INVENTOR(S) | : Gui et al. | |

It is certified that error appears in the above-identified patent and that said Letters Patent is hereby corrected as shown below:

In the Claims

Column 19, claim 11, line 11, after "claim 10, where" delete "the" (second occurrence).

Signed and Sealed this
Thirteenth Day of October, 2015

Michelle K. Lee
*Director of the United States Patent and Trademark Office*